United States Patent
Pfeffer

(10) Patent No.: US 7,220,689 B1
(45) Date of Patent: May 22, 2007

(54) IN LINE FACED MARINE INSULATION, AND METHOD OF PRODUCTION

(75) Inventor: Jack R. Pfeffer, Eagle, ID (US)

(73) Assignee: UPF Corporation, Bakersfield, CA (US)

( * ) Notice: Subject to any disclaimer, the term of this patent is extended or adjusted under 35 U.S.C. 154(b) by 220 days.

(21) Appl. No.: 10/628,098

(22) Filed: Jul. 28, 2003

Related U.S. Application Data

(63) Continuation-in-part of application No. 10/165,718, filed on Jun. 8, 2002, now Pat. No. 6,811,649.

(51) Int. Cl.
*B32B 5/26* (2006.01)
*A61F 13/15* (2006.01)

(52) U.S. Cl. .......... 442/277; 442/268; 442/61; 442/180; 156/62.2; 156/182; 156/297; 156/307.1; 156/307.3; 156/308.2

(58) Field of Classification Search .......... 442/62, 442/136, 149, 180, 268, 277; 52/27; 156/62.2
See application file for complete search history.

(56) References Cited

U.S. PATENT DOCUMENTS

| | | | |
|---|---|---|---|
| 2,676,898 A | 4/1954 | Folger et al. | |
| 2,744,044 A | 5/1956 | Toulmin, Jr. | |
| 3,769,131 A | 10/1973 | Genson | |
| 4,187,275 A * | 2/1980 | Bracalielly et al. | 264/511 |
| 5,018,220 A | 5/1991 | Lane et al. | |
| 5,389,121 A | 2/1995 | Pfeffer | |
| 5,472,467 A | 12/1995 | Pfeffer | |
| 5,527,598 A | 6/1996 | Campbell et al. | |
| 5,560,985 A * | 10/1996 | Watanabe et al. | 442/245 |
| 5,985,411 A | 11/1999 | Pfeffer | |
| 6,333,280 B1 * | 12/2001 | Hashimoto et al. | 442/70 |
| 6,811,649 B2 | 11/2004 | Pfeffer | |

FOREIGN PATENT DOCUMENTS

FR 2409855 11/1977

* cited by examiner

*Primary Examiner*—Cheryl A. Juska
*Assistant Examiner*—Arden B. Sperty
(74) *Attorney, Agent, or Firm*—William W. Haefliger

(57) ABSTRACT

A method of producing a lightweight heat resistant and insulative composite sheet, and containing glass fibers, consisting essentially of homogenized glass fiber and binder materials forming a first layer, binder material extending in a second layer on a surface of the first layer and bonded thereto, woven glass fiber facing cloth extending in a third layer on a surface of the second layer and bonded thereto so that the second layer is sandwiched between the first and third layers, binder material in all layers being cured, to integrate the layers.

24 Claims, 3 Drawing Sheets

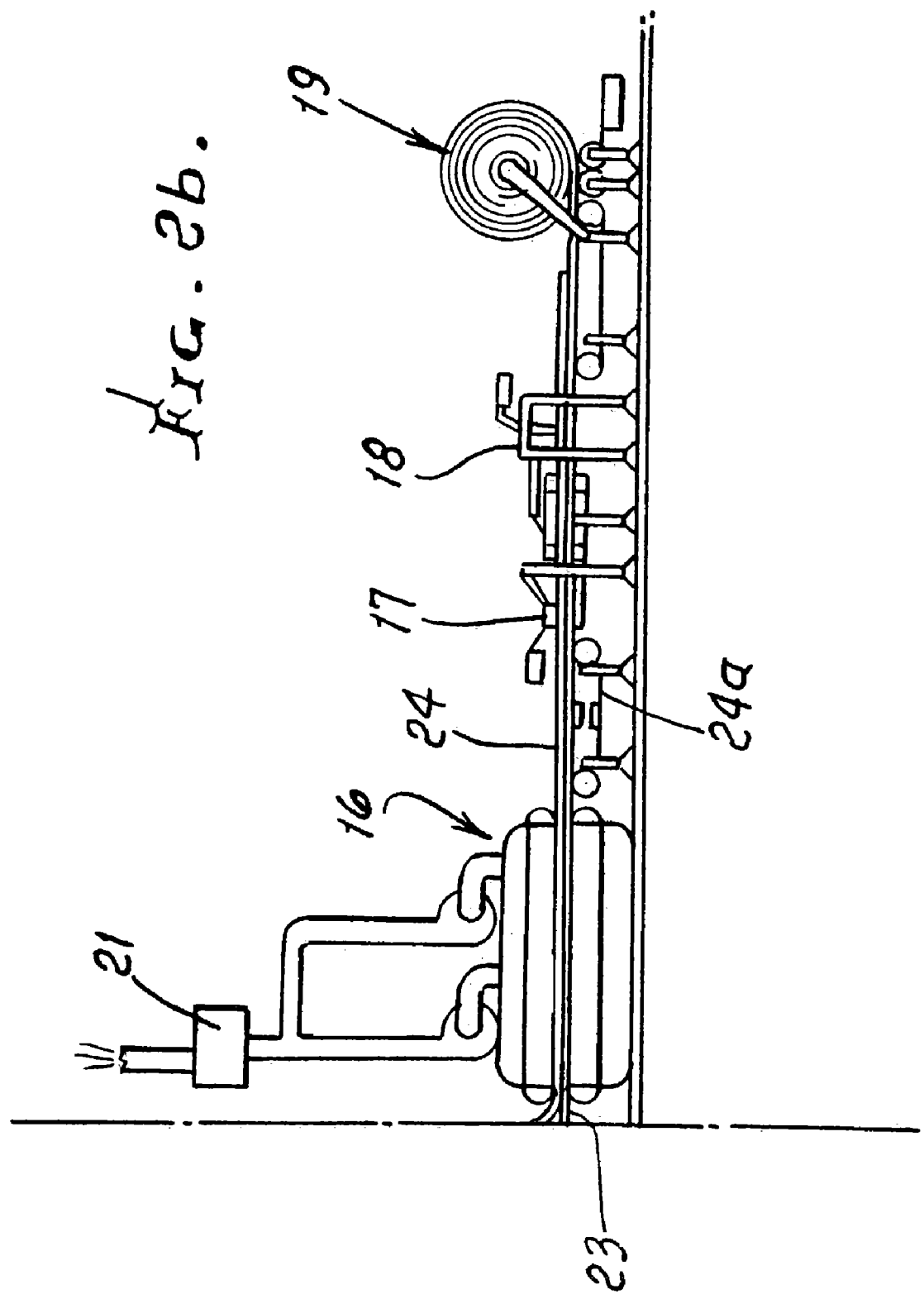

ID LINE FACED MARINE INSULATION, AND METHOD OF PRODUCTION

Figure 1:
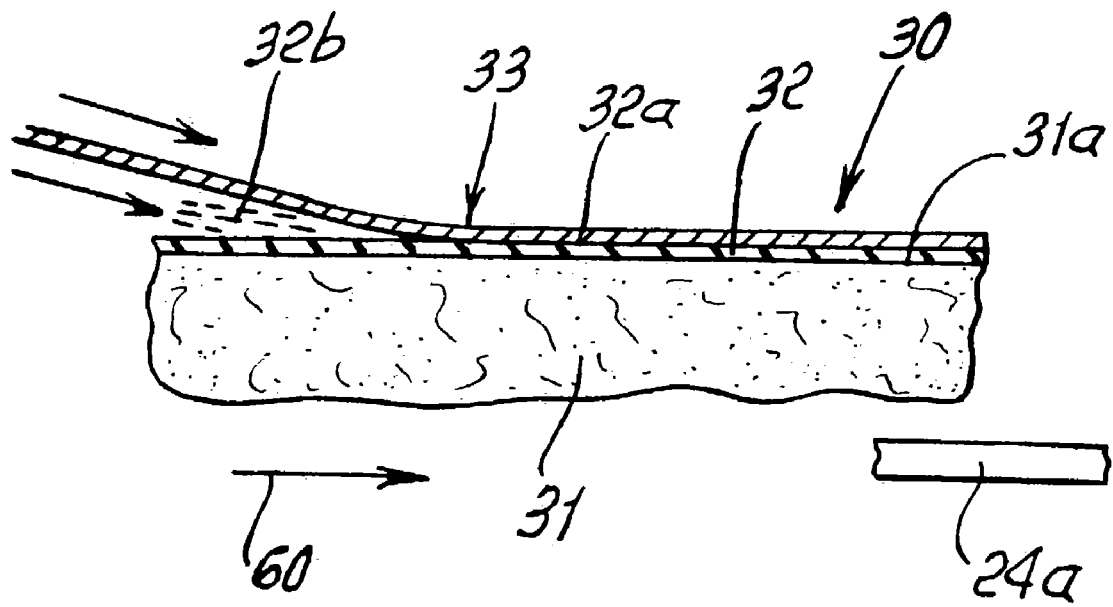

This application is a continuation-in-part of application Ser. No. 10/165,718 filed Jun. 8, 2002 now U.S. Pat. No. 6,811,649.

BACKGROUND OF THE INVENTION

This invention relates generally to formed and forming of faced, marine or other transportation, heat resistant insulation; and more particularly to a lightweight, sturdy, protective and insulative board product.

There is need for lightweight board-like products as referred to, and particularly in marine environments, as for example on ships. Prior glass fiber board products were objectionable due to production of itching or irritation of users, and to their intrinsic weight, which requires a mode costly installation. There is need for glass fiber content protective facing board products that will not produce objectionable itching, and for products having the highly advantageous features of construction, functions and results provided by the methods disclosed herein.

SUMMARY OF THE INVENTION

It is a major object to provide an improved board product with glass fiber content, that meets the above need and overcomes prior problems. Basically, the board product of the invention is a lightweight, insulative, composite sheet consisting essentially of, or combining, a) homogenized glass fiber and binder material forming a first layer, b) binder material extending in a second layer adjacent the first layer and bonded thereto, c) woven glass fiber facing cloth extending in a third layer adjacent the second layer and bonded thereto so that the second layer is sandwiched between the first and third layers, d) the binder material being cured to integrate the product.

As will be seen, the first layer is provided to have a wool-like composition; and the second layer binder resin typically has a sprayed-on, and cured in situ, configuration on the surface of the wool-like first layer. Also, the first layer typically and preferably consists of about 80% by weight of glass fibers, and about 20% by weight of binder resin, the combination or mix of these materials being homogenized. The third layer woven cloth has a binder content of less than about 10%, and is adherent to a surface of the second layer, whereby the second layer is sandwiched between the first and third layers. The binder synthetic resin typically consists of Phenol Formaldehyde; and the glass fibers in the first layer are typically between 1 and 2 microns in length, and between 0.00003 to 0.00015 inches in diameter, and surrounded by binder resin in the wool-like, cured state of the first layer.

The basic method of the invention includes:

i) forming a composite, three layer laminated sheet as defined above, ii) and drying and curing the composite sheet, at elevated temperature, as for example between 425° and 475° F.

As will be seen, the facing cloth layer is preferably applied onto the surface of the sprayed-on binder layer just prior to step ii) referred to above, to achieve optimum strength of the cured product.

These and other objects and advantages of the invention, as well as the details of an illustrative embodiment, will be more fully understood from the following specification and drawings, in which:

DRAWING DESCRIPTION

Figure 3:
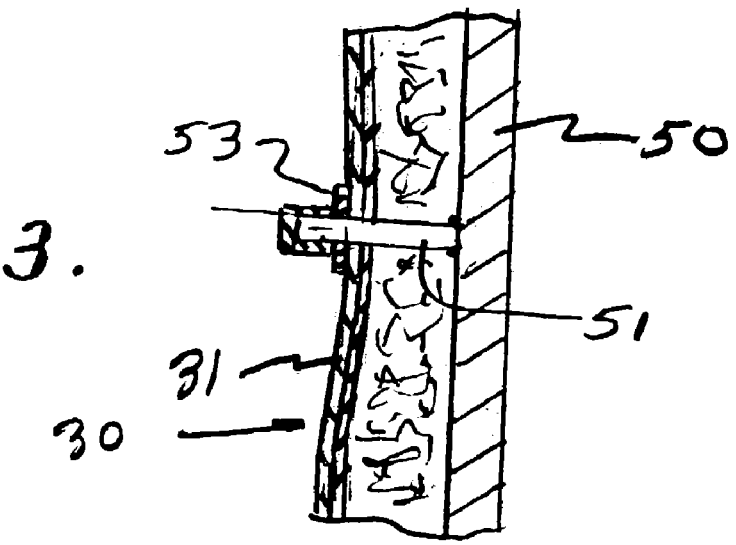
Figure 2A:
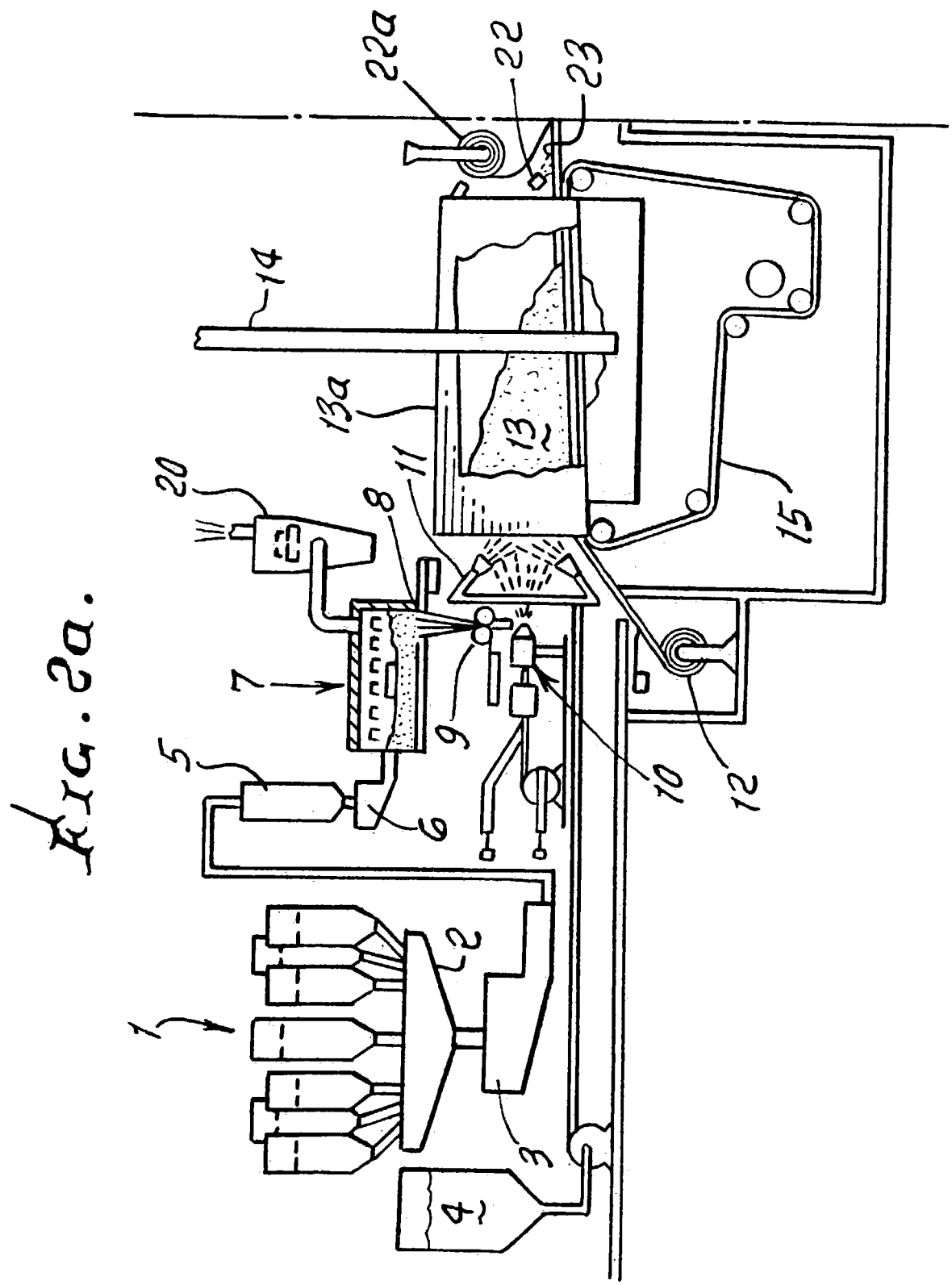

FIG. 1 is an enlarged sectional view showing formation of a preferred composite sheet or board, and the resultant product;

FIGS. 2*a* and 2*b* are an elevation showing further details of product formation; FIG. 2*b* being a continuation of 2*a*; and FIG. 3 is an elevation showing application of the formed protective sheet or board to marine structure, to protect same.

DETAILED DESCRIPTION

Referring first to FIG. 1, the lightweight, insulative, composite sheet or board, containing glass fibers, and in formed condition, is shown as 30. It includes:

a) homogenized glass fiber and binder material forming a first layer 31;

b) binder material, i.e. resin, extending in a second layer 32, adjacent the surface 31*a* of the first layer, and bonded to that surface; surface 31*a* typically being irregular; and c) woven glass fiber facing cloth extending in a third layer 33 adjacent a surface 32*a* of the second layer, and bonded to that surface. As a result, second layer 32 is sandwiched between the first and third layers 31 and 33, and firmly attaches 31 to 33.

The first layer 31 typically has a wool-like composition, and has a density of between 0.5 and 4.0 (and preferably about 0.75) pounds per cubic foot of layer 31. The overall thickness of sheet or board 30 is between 0.75 and 4.0 inches and preferably about 1.0 inch. First layer 31 preferably consists of about 80% by weight of glass fibers, and about 20% by weight of binder resin, the fibers and resin being homogenized whereby the fibers are thoroughly dispersed in and individually covered by the binder resin, and uniformly dispersed in layer 31. The glass fibers in layer 31 preferably have diameters between 0.00003 and 0.00015 inches, and enhance product high performance and low weight. The bulk of (and preferably about all of) the glass fibers in layer 31 have lengths between about 1 and 2 microns.

The second layer binder 32 typically has a sprayed-on and cured in situ configuration. Spray-on assures binder penetration in and at the surface of layer 31. Numeral 35 in FIG. 1 indicates spray-on of binder 32*b* onto surface 31*a* of layer 31, as layer 31 is transported lengthwise as on conveyor 24*a* in FIG. 2. See arrow 60 in FIG. 1.

The facer cloth layer 33 typically has a binder content of less than 10% by weight. Such binder content is impregnated in the cloth, whereby curing of the composite sheet cures the binder in layer 33 and the latter becomes firmly bonded to 100% binder layer 32 which in turn firmly bonds to layer 31. Facer cloth layer 33 has weight between 20 and 60 grams per square foot.

The elevated curing temperature is typically between 425° F., for binder resin consisting of Phenol Formaldehyde, Melamine and other thermal/set resins. Drying and curing at such elevated temperature or temperatures is completed during a time interval between 2 and 4 minutes. The sheet 30 is preferably traveled endwise through a curing oven, for that purpose, and thereafter the sheet is slit into strips as required. See FIG. 2*b*. The facer cloth layer 33 is preferably fed or traveled progressively and endwise onto the sprayed on binder layer 32 just prior to entry of the composite assembly into the curing oven.

FIG. 2*a* shows the complete, flame attenuation process, with numerals 1-22 applied to elements or steps of the process. Such numerals identify the following:

1. holding tanks for batch glass ingredients
2. batch weighting and mixing apparatus (computer controlled)
3. batch transport apparatus
4. binder resin tank
5. batch holding tank, proximate furnace
6. apparatus to feed bath ingredients from tank 5 to furnace 7
7. furnace operated at or near 2450° F.
8. bushings through which molten glass flows from furnace, at about 1750° F. Bushings typically consist of platinum and rhodium
9. rolls to pull glass through bushings, to produce fibers
10. burners, for producing hot gas jets to melt the fibers, to attenuate them into finer fibers displaced or blown rightwardly (see U.S. Pat. No. 5,389,121) to mix with binder, sprayed at 11.
11. binder spray nozzles receiving binder pumped from 4
12. CEREX (glass) web backer roll, feeding backer sheet to travel rightwardly on chain conveyor 15, within enclosure 13*a*, to support the homogenized (mixed) glass fibers and binder resin, collecting at 13.
13. homogenized mix collection
14. forming fans
15. chain conveyor
16. curing oven through which formed layers travel (see layers 31, 32 and 33 in FIG. 1)
17. slitters, to slit cured product into strips
18. choppers to cut strips to selected length
19. roll-up roll, for roll-up of product
20. furnace air pollution control and treating apparatus
21. oven gas pollution control and treating apparatus
22. over-spray nozzles to pray binder layer 32 onto surface of homogenized layer 31 (see FIG. 1)
22*a*. supply roll to feed woven glass facer layer onto sprayed-on binder layer (see FIG. 1)
23. binder over-spray layer
24. finished, faced product traveling on conveyor 24*a*, toward slitters 17, FIG. 3 shows application of the product sheet or board 30 to marine panel or support structure 50, which may be metallic, as by fasteners at 51, to protect 50. Panel 50 is typically employed in a marine environment. Fasteners 51 are located at spaced apart intervals. The fasteners attach to 50 and project or punch through the board 30, as the board is applied to panel 50. As shown, the fasteners preferably comprise studs attached at 52 to the panel 50. Washers 53 are applied over the ends of the studs, to engage first layer 31, and are held in place by caps 54. The caps interior bores 54*a* have interference fit with the fasteners and are forcibly pushed into place and frictionally retained in position. Washers 53 and caps 54 define holders.

I claim:

1. A lightweight heat resistant and insulative composite product sheet, containing glass fibers, consisting essentially of:
    a) homogenized glass fiber and binder material forming a first layer,
    b) binder material extending in a second layer adjacent the first layer and bonded thereto,
    c) woven glass fiber facing cloth extending in a third layer adjacent the second layer and bonded thereto so that the second layer is sandwiched between the first and third layers,
    d) binder material in the layers being cured at elevated temperature between about 425° F. and 475° F., and during a time interval between 2 and 4 minutes, to integrate the layers, and
    e) the bulk of the fibers in said first layer having diameters between 0.00003 and 0.00015 inch.

2. The composite sheet of claim 1 wherein the first layer has a density of about ¾ pound per sheet cubic foot, the product sheet having between about 0.75 and 4.0 inch thickness and from 0.5 to 4.0 pounds per cubic foot density.

3. The composite sheet of claim 1 wherein said second layer binder has a sprayed on and cured in situ configuration adjacent the first layer.

4. The composite sheet of claim 1 wherein the bulk of the glass fibers in said first layer have length between about 1 and 2 microns.

5. The composite of claim 1 wherein the first layer consists of about 80% by weight of glass fibers and about 20% by weight of binder, said fibers and binder being homogenized.

6. The composite sheet of claim 1 wherein said first layer has density between 0.5 and 4.0 pounds per cubic foot.

7. A lightweight heat resistant and insulative composite product sheet, containing glass fibers, consisting essentially of:
    a) homogenized glass fiber and binder material forming a first layer,
    b) binder material extending in a second layer adjacent the first layer and bonded thereto,
    c) woven glass fiber facing cloth extending in a third layer adjacent the second layer and bonded thereto so that the second layer is sandwiched between the first and third layers,
    d) binder material in the layers being cured at elevated temperature between about 425° F. and 475° F., and during a time interval between 2 and 4 minutes, to integrate the layers,
    e) and wherein first layer density is about 0.75 pounds per cubic foot.

8. The composite sheet of claim 1 wherein the facer cloth has a binder content of less than 10% by weight of said cloth, and is adherent to a surface of the second layer, so that the second layer is sandwiched between and integrates the first and third layers.

9. A lightweight heat resistant and insulative composite product sheet, containing glass fibers, consisting essentially of:
    a) homogenized glass fiber and binder material forming a first layer,
    b) binder material extending in a second layer adjacent the first layer and bonded thereto,
    c) woven glass fiber facing cloth extending in a third layer adjacent the second layer and bonded thereto so that the second layer is sandwiched between the first and third layers,
    d) binder material in the layers being cured at elevated temperature between about 425° F. and 475° F., and during a time interval between 2 and 4 minutes, to integrate the layers,
    e) said facer cloth having a binder content of less than 10% by weight of said cloth, and is adherent to a surface of the second layer, so that the second layer is sandwiched between and integrates the first and third layers, f) and wherein the facer cloth has weight between 20 and 60 grams per square foot, and consists of woven glass fibers.

10. A lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers,
   e) said sheet having density of from 0.5 to 4.0 pounds per cubic foot.

11. The composite sheet of claim 10 wherein the glass fibers in the first layer have diameters between 0.00003 and 0.00015 inch.

12. The composite sheet of claim 1 which has between 0.75 and 4.0 inch thickness.

13. The method which comprises:
   i. forming a composite sheet as defined in claim 1,
   ii. and including drying and curing said sheet, at elevated temperature, while being transported on a conveyor.

14. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and said method including drying and curing said sheet, at elevated temperature, while being transported on a conveyor, and wherein said elevated temperature is between about 425° F. and 475° F.

15. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and said method including drying and curing said sheet, at elevated temperature, while being transported on a conveyor, said drying and curing at elevated temperature being completed during a time interval between 2 and 4 minutes.

16. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and
   e) said method including drying and curing said sheet, as elevated temperature, while being transported on a conveyor, and
said method including spraying said binder onto an irregular upper surface of said first layer.

17. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and
   e) said method including drying and curing said sheet, as elevated temperature, while being transported on a conveyor, and wherein the binder consists of synthetic resin.

18. The method of claim 17 wherein said resin consists of phenol formaldehyde.

19. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and said method including drying and curing said sheet, as elevated temperature, while being transported on a conveyor, and including progressively feeding said facing cloth onto said sprayed on binder layer just prior to said step ii) of claim 13.

20. The method of forming a lightweight heat resistant and insulative composite product sheet, containing glass fibers, consisting essentially of:
   a) homogenized glass fiber and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers, and e) said method including drying and curing said sheet, as elevated temperature, while being transported on a conveyor, and wherein the binder material consists of synthetic resin.

21. The method of claim 20 wherein the binder material consists of phenol formaldehyde.

22. The assembly which comprises a metallic panel, fasteners projecting from the panel, and the product sheet applied to the panel to form a facing, with the fasteners projecting through the product sheet, said product being a lightweight, heat resistant and insulative composite product sheet, containing glass fibers, consisting essentially of:
   a) homogenized glass fibers and binder material forming a first layer,
   b) binder material extending in a second layer adjacent the first layer and bonded thereto,
   c) woven glass fiber facing cloth extending in a third layer adjacent the second layer and bonded thereto so that the second layer is sandwiched between the first and third layers,
   d) binder material in the layers being cured, to integrate the layers.

23. The assembly of claim 22 including holders on the fasteners to hold the product sheet against the panel.

24. The assembly of claim 23 wherein the fasteners comprise studs, and the holders comprise washers received on the studs, and caps frictionally retained on the ends of the studs to hold the washers in position.

* * * * *